C. N. FISHER.
BRICK-MACHINE.

No. 169,428. Patented Nov. 2, 1875.

WITNESSES
Thomas Bernard

INVENTOR
Charles N. Fisher,
Chipman & Co.,
ATTORNEYS

UNITED STATES PATENT OFFICE.

CHARLES N. FISHER, OF WILLIS, TEXAS, ASSIGNOR OF ONE-HALF HIS RIGHT TO JOSEPH FRAMPTON, OF SAME PLACE.

IMPROVEMENT IN BRICK-MACHINES.

Specification forming part of Letters Patent No. 169,428, dated November 2, 1875; application filed October 9, 1875.

*To all whom it may concern:*

Be it known that I, CHARLES N. FISHER, of Willis, in the county of Montgomery and State of Texas, have invented a new and valuable Improvement in Brick-Machines; and I do hereby declare that the following is a full, clear, and exact description of the construction and operation of the same, reference being had to the annexed drawings, making a part of this specification, and to the letters and figures of reference marked thereon.

Figure 1:
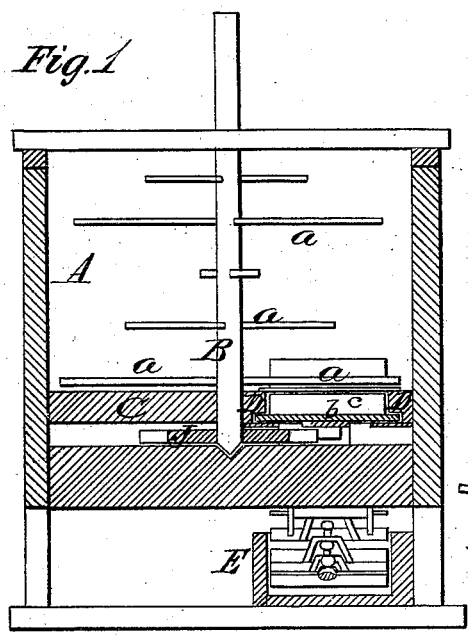
Figure 2:
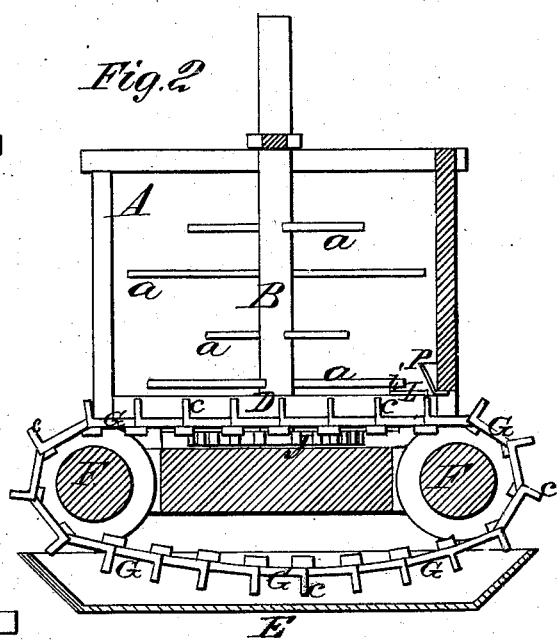
Figure 3:
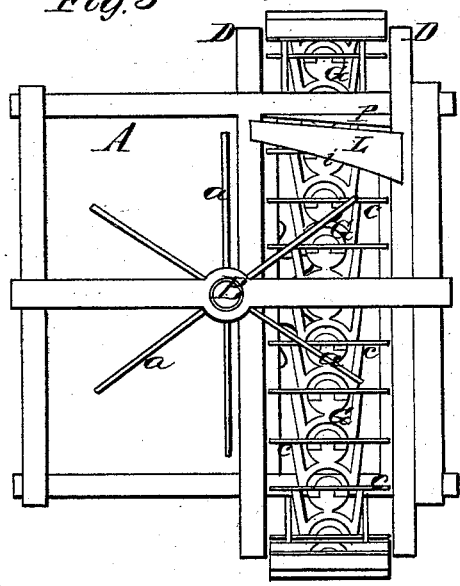
Figure 4:
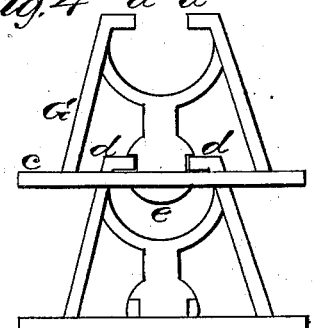
Figure 5:
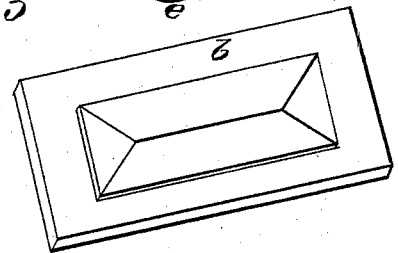

Figure 1 of the drawings is a representation of a transverse vertical section of my machine, and Fig. 2 is a longitudinal vertical sectional view thereof. Fig. 3 is a plan view, and Figs. 4 and 5 are detail views.

This invention has relation to machines for molding bricks; and the nature of my invention consists, mainly, in an endless chain of molds in the bottom of the press-box, actuated by a star-wheel or its equivalent on the vertical shaft of the pug-mill, in combination with a pressing-plate and a cut-off plate, as will be hereinafter explained.

The invention also consists in a novel construction of a chain for the endless molds, each link being constructed with a boss for engaging with the teeth of the star-wheel on the pug-mill shaft, as will be hereinafter explained.

In the annexed drawings, A designates a pug-mill box, in the center of which is a vertical shaft, B, which may be rotated in any suitable manner. This shaft is provided with radial blades or arms a, which stir and mix the clay, and at the same time press it downward. C designates the bottom of the box A, on one side of which are two guideways, D D, the upper edges of which are in the same plane as the upper side of the bottom C. Between the ways D D the molds pass to be filled with clay. The empty molds pass back through a trough, E, containing water, which will cleanse them of any adhering clay. The parallel guideways D D form the ends of the molds, removable boards b form the bottoms of the molds, and strips c form the sides of the mold. The strips c are formed on broad links G, which are loosely coupled together, so as to form an endless chain, which passes around flanged drums F at the ends of the ways D. Each link is constructed with two pivotal hooks, d d, on one end, and a stud, e, and plate c on the opposite end. The stud e, which is circular, is formed with notches to receive pivotal hooks corresponding to those above described.

The studs e serve as rack-teeth, and engage with the teeth of a wheel, J, keyed on shaft B beneath the floor C. By this simple means the endless chain of brick-molds receives rotation directly from the pug-mill shaft. Near the place where the bricks are discharged from the machine is a pressure-plate, L, which is secured upon the ways D in a slightly oblique position, as shown in Fig. 3.

The oblique edge i of the pressure-plate L is turned upward, for the purpose of allowing the clay to enter freely beneath it and be compacted in the molds.

As the molds leave the interior of the press-box the surfaces of the bricks in them are scraped and smoothed by means of an inclined cut-off, P, which removes the superfluous clay.

Fig. 5 shows one of the removable bottom boards b for the molds, which should be properly sanded before it is used.

Each board b is re-enforced by a batten, and is slightly longer than the molds, for the purpose of having its ends run in grooves made in the guideways D D.

What I claim as new, and desire to secure by Letters Patent, is—

1. An endless chain of molds at the bottom of the pug-mill box A, driven by means of a wheel on shaft B engaging with the studs on link G, substantially as described.

2. The pressure-plate L and cut-off P, combined with the endless chain of brick-molds and their guideways D D, substantially as described.

3. Links G, constructed with pivotal hooks d, notched lugs e, and plates C, as and for the purposes described.

In testimony that I claim the above I have hereunto subscribed my name in the presence of two witnesses.

CHARLES N. FISHER.

Witnesses:
RICHARD TAYLOR,
JOSH. FRAMPTON.